J. W. WOODWARD.
TROLLEY HOLDING AND RETRIEVING DEVICE.
APPLICATION FILED JUNE 13, 1908.
925,549.
Patented June 22, 1909.
2 SHEETS—SHEET 1.
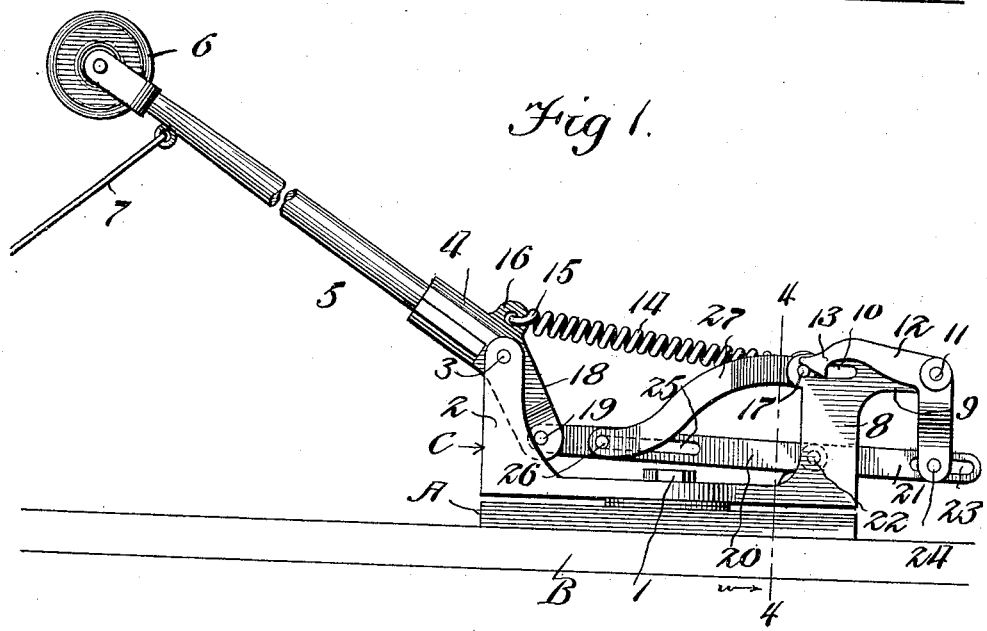
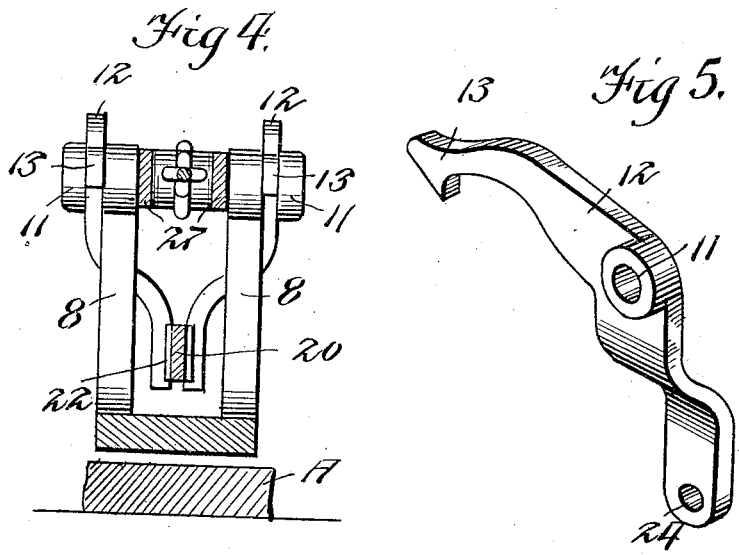
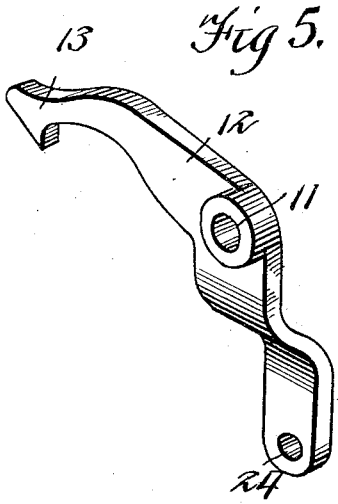
Witnesses
Hugh H. Ott,
C Bradway
Inventor
John W. Woodward
By Victor J. Evans
Attorney J. W. WOODWARD.
TROLLEY HOLDING AND RETRIEVING DEVICE.
APPLICATION FILED JUNE 13, 1908.
925,549.
Patented June 22, 1909.
2 SHEETS—SHEET 2.
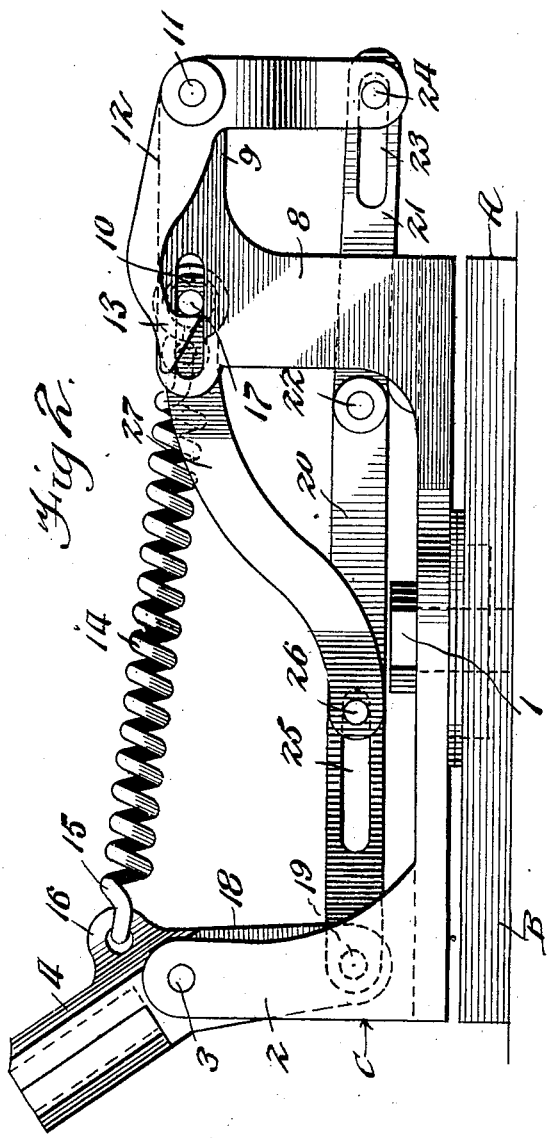
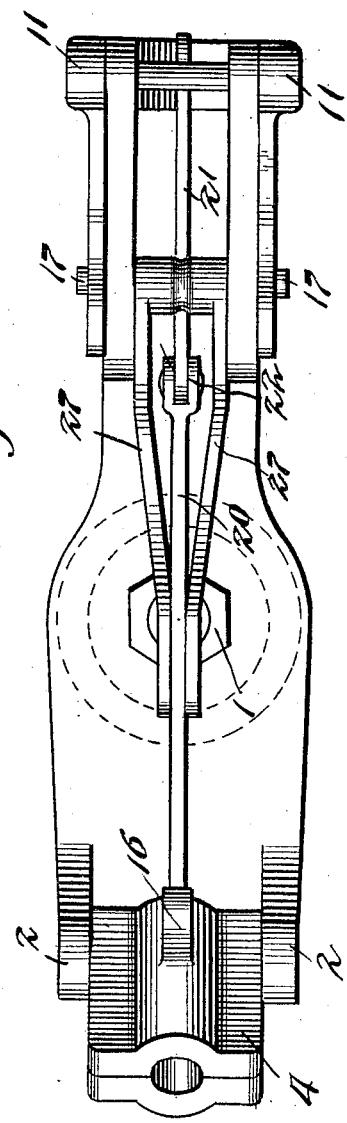
Witnesses
Hugh H. Ott
C Bradway
Inventor
John W. Woodward
By Victor J. Evans
Attorney

UNITED STATES PATENT OFFICE.

JOHN W. WOODWARD, OF ROCHESTER, NEW YORK.

TROLLEY HOLDING AND RETRIEVING DEVICE.

No. 925,549.      Specification of Letters Patent.      Patented June 22, 1909.

Application filed June 13, 1908. Serial No. 438,332.

*To all whom it may concern:*

Be it known that I, JOHN W. WOODWARD, a citizen of the United States, residing at Rochester, in the county of Monroe and State of New York, have invented new and useful Improvements in Trolley Holding and Retrieving Devices, of which the following is a specification.

This invention relates to a trolley holding and retrieving device of that character which normally holds the trolley wheel in contact with the overhead wire and is adapted, when the wheel accidentally runs off the wire, to automatically retrieve or lower the trolley pole so that the wheel will run below the cross wires of the overhead suspension and thus prevent such wires or trolley pole from being destroyed.

The invention has for one of its objects to improve and simplify the construction and operation of apparatus of this character so as to be comparatively simple and inexpensive to manufacture and install, thoroughly reliable and efficient in use, and readily manipulated.

Another object of the invention is the provision of a trolley pole holder and retrieving device having a spring which normally urges the trolley pole upwardly to maintain the wheel in contact with the overhead conductor, in combination with a releasing device which automatically disengages the spring when the trolley jumps off the wire and the pole ascends to a certain point when the pole will descend by gravity to a point below the wire so as to be out of the way of the cross wires of the overhead suspension.

Another object is the employment of means for restoring the spring by the conductor or attendant pulling downwardly on the trolley pole so that after the spring is restored, it is merely necessary for the conductor to guide the trolley pole in its upward movement by the tension of the spring so that the wheel will return to the trolley wire.

With these objects in view and others, as will appear as the description proceeds, the invention comprises the various novel features of construction and arrangement of parts which will be more fully described hereinafter and set forth with particularity in the claims appended hereto.

In the accompanying drawings, which illustrate one embodiment of the invention, Figure 1 is a side view of the device showing the trolley pole in retrieved position. Fig. 2 is an enlarged side elevation of the device with its parts in normal position. Fig. 3 is a plan view of Fig. 2, with the erectile spring removed. Fig. 4 is a transverse section on line 4—4, Fig. 1, drawn on an enlarged scale. Fig. 5 is a perspective view of one of the latches for holding the spring under tension or set.

Similar reference characters are employed to designate corresponding parts throughout the several views.

Referring to the drawings, A designates the base plate of the apparatus which is mounted on the top of the car B, Fig. 1, in the usual manner, and on the base plate is a frame C which is secured thereto by a bolt 1 that serves as a pivot on which the frame can turn. On one end of the frame are two spaced standards 2 which support, at their upper ends, a horizontal pivot or fulcrum 3 on which the socket 4 tilts, and in the socket is the trolley pole 5 that carries at its upper end the current-collecting device or wheel 6, the pole being equipped with the usual retrieving cord 7 whereby the conductor can manipulate the trolley pole. At the opposite end of the frame are two spaced standards 8 that have lateral extensions or arms 9, and in the upper end of these standards are horizontal slots 10. The arms 9 support a horizontal pivot 11 on which tilts bell crank levers 12 that have their horizontal arms formed into latches 13 for holding the erectile spring 14 normally under tension or set. The spring 14, which is of the helical extension type, has one end 15 fastened to an apertured lug 16 on the socket 4 of the trolley pole, and the opposite end of the spring is fastened to a horizontal pin 17 that projects through the slots 10 of the arms 8 so that the extremities of the pin can be engaged by the latches 13.

The socket 4 has a depending arm 18 disposed between the standards 2, and pivotally connected therewith at 19 is an actuating rod 20 that passes horizontally between the arms 8. This actuating rod has a terminal section 21 hingedly connected with the main portion of the rod at 22, and the part 22 has a slot 23 in which is slidably mounted the pin 24 carried on the lower ends of the vertical arms of the bell crank levers 12. The rod 20 is adapted to be moved longitudinally, and by means of the ends of the slot 23 engaging the pin 24, the latches 13 can be engaged or disengaged. The actuating rod 20 is provided at an intermediate point with a longitudinal slot 25 through which extends a pin 26 that connects a yoke 27 with the pin 17 to said yoke being fastened to the pin 17 to serve as a re-setting device for the spring.

In practice, the parts are in the position shown in Fig. 2, when the trolley wheel is riding on the overhead conductor, and the spring 14 is under sufficient tension to maintain the wheel firmly in contact with the conductor. If, for any reason, the trolley wire leaves the overhead conductor, the spring 14 will contract and tend to further erect the trolley pole and cause the rod 20 to be pulled to the left, thereby eventually tilting the bell crank levers 12 and release the latches 13 from the pin 17. As soon as the pin is released, the spring loses its tension and the trolley pole will drop by gravity to a point where the wheel or pole will be below the cross wires that support the overhead conductor, thus averting damage to such wires or the trolley pole. When this occurs, the parts will be in the position shown in Fig. 1, and all that is required to return the trolley wheel to the overhead wire, is for the conductor or attendant to pull downwardly on the rope 7 so as to move the actuating rod 20 to the right a sufficient distance to cause the yoke 27 to expand the spring 14 and force the pin 17 under the latches 13, and during the last part of the movement of the rod 20, the latches will be forced down behind the ends of the pin 17 by means of the inner end of the outer slot 23 engaging the pin 24 of the bell crank levers 12. As the spring is now under tension, the trolley pole will be raised and the conductor then guides the trolley wheel by means of the rope 7, so that the wheel will return to the overhead wire.

From the foregoing description, taken in connection with the accompanying drawings, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims appended hereto.

Having thus described the invention, what I claim is:—

1. In a device of the class described, the combination of a supporting frame, a trolley pole pivoted thereon, a helical extension spring connected with the trolley pole for holding the same in erect position, a slidably-mounted pin attached to the spring, a latch device mounted on the frame and held by gravity in engagement with the pin, and means connected with the device and pole for releasing the device as the trolley pole ascends to a certain point for removing the tension of the spring to permit the trolley pole to lower by gravity.

2. In a device of the class described, the combination of a supporting frame, a trolley pole pivoted thereon, a helical extension spring connected with the trolley pole for holding the same in erect position, a slidably-mounted pin attached to the spring, a latch device mounted on the frame and held by gravity in engagement with the pin, means connected with the device and pole for releasing the device as the trolley pole ascends to a certain point for removing the tension of the spring to permit the trolley pole to lower by gravity, and means for placing the spring under tension and engaging the pin with the device upon the trolley pole reaching a predetermined lowered position.

3. In a device of the class described, the combination of a supporting frame, a trolley pole pivotally mounted thereon, a helical extension spring connected at one end with the pole for maintaining the latter in raised position, a slidably mounted member connected with the other end of the spring, a locking device engaging the member and held in engagement by gravity, an element between the trolley pole and device for releasing the latter by an upward movement of the pole, a re-setting member connected with the first-mentioned member, and a slot and pin connection between the second member and the element.

4. The combination of a pivoted current-collecting member, an erectile spring therefor connected at one end to the member, a pivotally mounted latch device normally connected with the opposite end of the spring for normally holding the latter under tension, an operating rod connected with the member and with the device for releasing the latter automatically when the member assumes an abnormal position.

5. The combination of a pole, a current-collecting device thereon, a spring connected with the pole to maintain the latter in normal position, a device arranged to hold the spring under tension, an actuating rod connected with the pole composed of hingedly-connected parts for releasing the said device, a lost motion between the device and rod, and means for resetting the spring.

6. The combination of a trolley pole, a frame on which the same is pivoted, an erectile spring connected at one end with the trolley pole, a device pivoted on the frame and arranged to be releasably connected with the opposite end of the spring to hold the latter under tension, an operating rod connected with the trolley pole, a slot and pin connection between the rod and said device, a re-setting device connected with the spring, and a slot and pin connection between the resetting device and operating rod.

7. The combination of a base plate, a frame pivoted thereon and having a pair of spaced standards at opposite ends, a trolley pole pivoted between one pair of standards, a spring connected at one end with the trolley pole and at the opposite end with the other standards, latches for releasably holding the spring under tension, an operating rod connected with the trolley pole, and latches for releasing the latter when the trolley pole is moved to a predetermined position.

8. The combination of a supporting frame, a trolley pole mounted thereon, an actuating rod connected with the pole, a bell crank lever mounted on the frame and having one arm formed into a latch, a slidably mounted member with which the latch normally engages, a yoke connected with the member and actuating rod, a spring connected with the member and trolley pole, and means for connecting the bell crank lever with the actuating rod.

In testimony whereof I affix my signature in presence of two witnesses.

JOHN W. WOODWARD.

Witnesses:
CARRIE KOEHLER,
LIBBIE PEO.